(12) United States Patent
Muegge

(10) Patent No.: US 11,898,716 B2
(45) Date of Patent: Feb. 13, 2024

(54) LIGHTING DEVICE FOR A MOTOR VEHICLE

(71) Applicant: HELLA GmbH & Co. KGaA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/980,260

(22) Filed: Nov. 3, 2022

(65) Prior Publication Data
US 2023/0135025 A1     May 4, 2023

(30) Foreign Application Priority Data

Nov. 4, 2021    (DE) .......................... 102021128664.6

(51) Int. Cl.
| | | |
|---|---|---|
| *F21S 43/20* | (2018.01) | |
| *B60Q 1/26* | (2006.01) | |
| *F21V 9/40* | (2018.01) | |
| *G02F 1/13357* | (2006.01) | |
| *B60Q 1/44* | (2006.01) | |

(52) U.S. Cl.
CPC ............ *F21S 43/26* (2018.01); *B60Q 1/2607* (2013.01); *B60Q 1/44* (2013.01); *F21V 9/40* (2018.02); *G02F 1/133621* (2013.01)

(58) Field of Classification Search
CPC ........ F21S 43/26; F21S 43/237; F21S 43/245; F21S 43/235; F21S 43/239; F21S 43/251; F21S 43/249; F21S 43/20; F21S 43/33; F21S 43/40; F21S 43/50; F21S 43/51; F21S 43/16
See application file for complete search history.

(56) References Cited

U.S. PATENT DOCUMENTS

| | | | |
|---|---|---|---|
| 4,872,745 A | 10/1989 | Fujisawa et al. | |
| 9,151,460 B2 * | 10/2015 | Stagg | ................... B60Q 1/2607 |
| 2023/0020516 A1 * | 1/2023 | Mazuir | ................ F21S 41/635 |

FOREIGN PATENT DOCUMENTS

| | | | | |
|---|---|---|---|---|
| DE | 102019213247 B4 * | 9/2021 | ............... | B60Q 1/38 |
| DE | 102019213247 B4 | 9/2021 | | |

\* cited by examiner

*Primary Examiner* — Matthew J. Peerce
(74) *Attorney, Agent, or Firm* — Muncy, Geissler Olds & Lowe, P.C.

(57) ABSTRACT

A lighting device for a motor vehicle having at least one first module and at least one second module and is set up to produce light with a second color different from a first color of the first module in operation of the lighting function. A shared at least partially transparent cover for the at least one first and the at least a second module is designed such that the light emitted by the respective module can escape through the cover from the lighting device. An LC display is arranged between the at least one first module and the cover and is set up to be controlled such that at least part of the light emitted by the first module enters an inlet surface of the LC display and exits from an exit surface of the LC display at least partially in the direction of the cover.

12 Claims, 2 Drawing Sheets

LIGHTING DEVICE FOR A MOTOR VEHICLE

This nonprovisional application claims priority under 35 U.S.C. § 119(a) to German Patent Application No. 10 2021 128 664.6, which was filed in Germany on Nov. 4, 2021, and which is herein incorporated by reference.

BACKGROUND OF THE INVENTION

Field of the Invention

The present invention relates to a lighting device for a motor vehicle.

Description of the Background Art

The styling and design of lighting devices of the aforementioned type is often characterized by the desire for an appearance with a uniform color, in particular in the case of rear lights for a motor vehicle, by the desire for as complete a red appearance as possible.

However, the signal functions of the reversing light with white light and the direction indicator with yellow light prove to be difficult for designing a complete red appearance. While the taillight, the brake light and the rear fog light are red signal functions that also work through a red colored disc that serves as a cover for various modules, this is not possible for the reversing light with white light and the direction indicator with yellow light.

A solution is realized in the prior art for series luminaires by the fact that the pane is designed in a bright red or pink shade, either completely or only in the area of the direction indicator, while the remaining surface of the light disc is colored in a normal or darker red. The exception here is the reversing light, which does not work at all behind a bright red disc, because the white light is colored accordingly or most of the light components are filtered out and only red light remains. The direction indicator, on the other hand, works with a bright red disc by using yellow light-emitting diodes with a suitable wavelength range, which in combination essentially results in yellow light.

SUMMARY OF THE INVENTION

It is therefore an object of the present invention to provide a lighting device, which has several modules for different signal functions and in the non-active state of the modules has a uniform color appearance.

In an exemplary embodiment, the lighting device comprises at least one first module for at least one first signal light function, wherein the at least one first module has at least one first light source and is set up to produce light with a first color in operation of the lighting function, at least one second module for at least one second signal light function, wherein the at least one second module has at least one second light source and is set up to produce light with a second color different from the first in the operation of the lighting function, a shared at least partially transparent cover for the at least one first and at least one second module, which is designed in such a way that in operation of the lighting device the light emitted by the respective module can escape through the cover from the lighting device, and an LC display, which is arranged between the at least one first module and the cover and is set up to be controlled in such a way that in the operation of the at least one first module at least part of the light exiting from the at least one first module enters an inlet surface of the LC display and exits from an exit surface of the LC display at least partially in the direction of the cover.

An LC display, which can be arranged between the at least one first module and the cover, can influence the color of the at least one first module in the non-active state of the module.

It is possible that the LC display can be at least partially switchable between an operating state and a non-operating state, wherein in the operating state the light emitted by the at least one first module at least partially escapes through the exit surface of the LC display and wherein in the non-operating state the light emitted by the at least one first module does not escape through the exit surface of the LC display. In particular in the non-operating state of the LC display, it can have a suitable color.

It may be provided that the LC display is a passive LC display. For an automotive lighting function, small areas are generally used, from which a high light output or a high brightness must be realized. Therefore, a high degree of transmission of the LC display is important in order to generate the legally required light intensities of a signal function. In contrast to an active LC display, a passive LC display has no active components such as transistors, so that the transmittance of the passive LC display is significantly greater than that of an active LC display. Furthermore, a passive LC display can be produced much more cost-effectively than an active LC display. An advantage of a passive LC display is also an arbitrarily designed pixelation of the LC display. This allows for separately switchable pixels of the LC display to be given an arbitrary, different shape and size and thus actively define the desired design of a switchable matrix for the lighting function.

There is a possibility that the LC display is a guest host display or a smart glass display. With such an LC display, no polarization filters are required, so that a higher degree of transmission is available, which is advantageous for the fulfillment of the desired light function. Furthermore, the LC display is also angle-independent due to the omission of the polarizers.

It may be provided that the LC display is an LC display doped with color pigments. In particular, the LC display can be a so-called dye-doped display, which is doped with color pigments that determine the color of the LC display in the non-operating state. Thus, especially in the non-operating state, for example, a red or a black surface may be visible.

It is possible that the LC display in the non-operating state can have a color visible from the outside through the cover, which corresponds to the second color and/or corresponds to the color visible from the outside through the cover of the at least one second module with the second light source switched off. In particular, the color of the LC display visible from the outside through the cover in the non-operating state may be a red or a black color.

It may be provided that the at least one first signal function is the function of a direction indicator and/or a reversing light, and that the first color is a yellow color and/or a white color. Furthermore, it may be provided that the at least one second signal function is the function of a taillight and/or a brake light and/or a rear fog light, and that the second color is a red color. Despite the different colors of the individual modules, the LC display arranged in front of the module serving as a direction indicator and/or in front of the module serving as a reversing light can change the color of the modules visible from the outside through the cover. For example, in the case of red color of the second modules designed as taillight, brake light and rear fog light, a uniform appearance of the lighting device in the non-active state of the modules can be ensured by a corresponding red color of the LC display in the non-operating state.

The lighting device can be a rear light of, for example, a vehicle. In this, for example, as first modules a direction indicator and a reversing light and as second modules a taillight, a brake light and a rear fog light may be provided.

The LC display can have a plurality of segments that can be controlled independently of each other. The independently controllable segments of the LC display may be different from each other in terms of their size and/or shape.

The LC display can be mounted on the side of the cover facing the at least one first module. For example, the LC display may be formed as a film element, in particular wherein the film element is glued to the side of the cover facing the at least one first module or wherein the film element was inserted into an injection mold as an injection molding part as part of the production of the cover and overmolded with the cover. This results in a compact design of the lighting device and a safe installation of the LC display.

The LC display can be arranged as a separate part between the at least one first module and the cover. As a result, the LC display can be positioned more flexibly or, for example, replaced more easily in the event of a defect.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The lighting device shown in the figures is designed as a rear light and comprises a plurality of modules that can realize different signal functions. Each of the modules has at least one light source not shown in FIG. 1 and FIG. 2, which may be designed in particular as a light-emitting diode.

Figure 1:
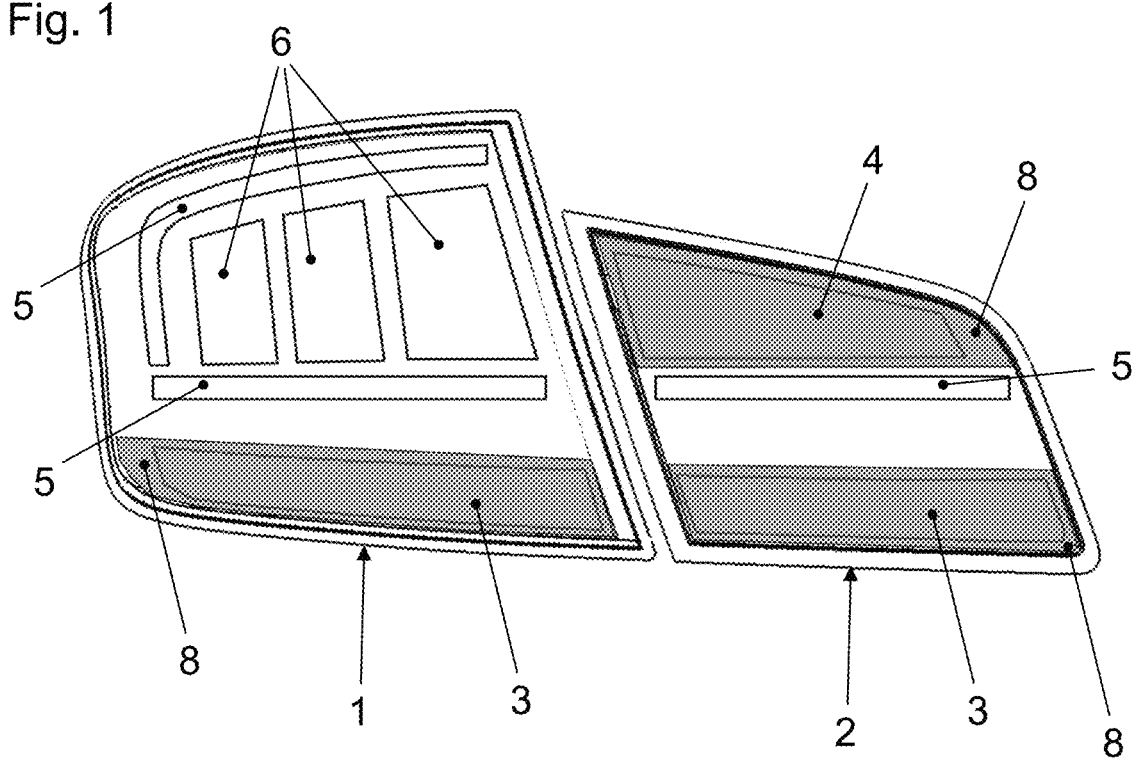
FIG. 1 is a front view of a lighting device according to the invention.
Figure 2:
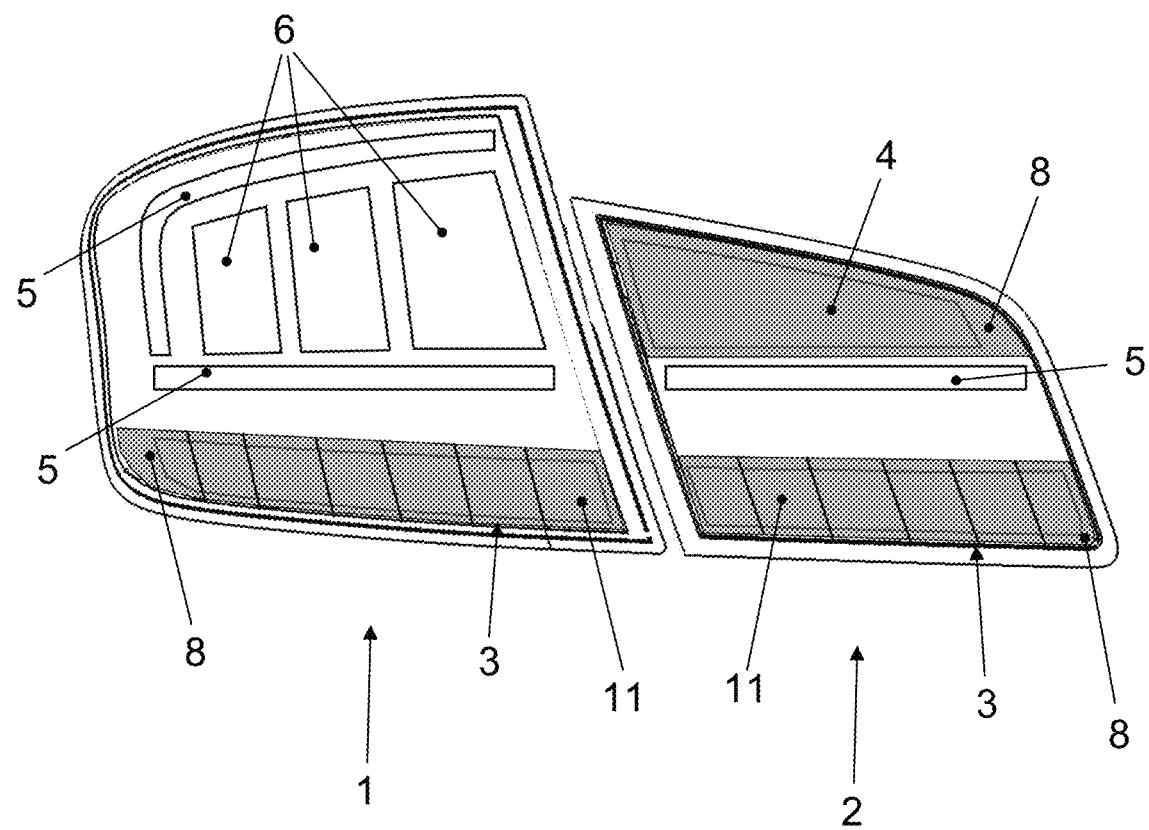
FIG. 2 is a front view of a lighting device according to the invention.

The lighting device is divided in the example shown into two side-by-side parts 1, 2 (see FIG. 1 and FIG. 2). However, it is quite possible to design the lighting device in one piece. Furthermore, it is possible to design the lighting device in such a way that it extends over the entire width of the motor vehicle.

The lighting device comprises two first modules 3, which can realize the signal function of a direction indicator. These first two modules 3 extend over both parts 1, 2 of the lighting device (see FIG. 1 and FIG. 2). These first two modules 3 emit yellow light in operation. The lighting device includes another first module 4, which can realize the signal function of a rear light. This first module 4 is arranged in the second part 2 of the lighting device. This first module 4 emits white light during operation.

The lighting device comprises three second modules 5, which can realize the signal function of a taillight. These three second modules 5 also extend over both parts 1, 2 of the lighting device (see FIG. 1 and FIG. 2). The lighting device comprises three further second modules 6, which can realize the signal function of a brake light. These three further second modules 6 are in the first part 1 of the lighting device. The second modules 5, 6 emit red light during operation.

It is quite possible that the lighting device has an additional, not pictured second module, which can realize the signal function of a rear fog light.

Figure 4:
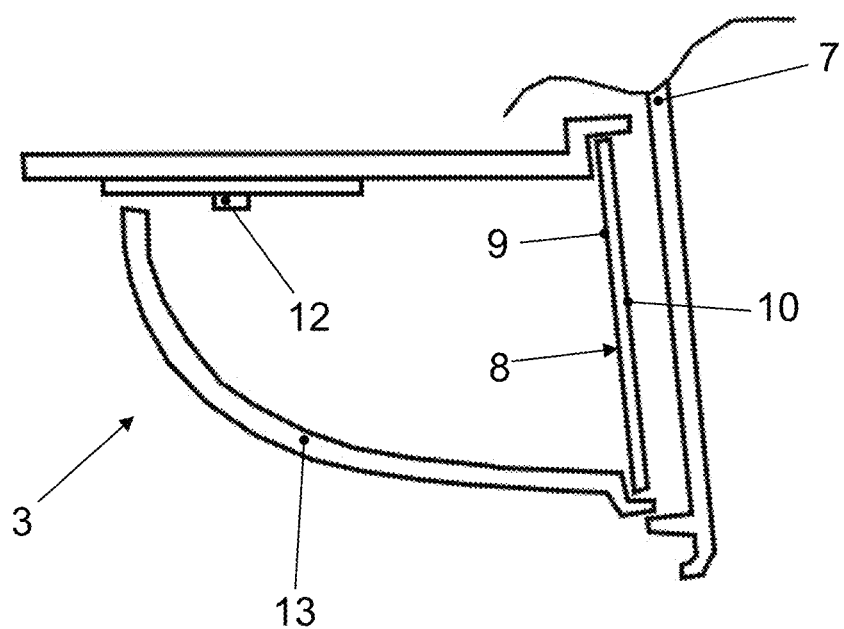
FIG. 4 is a sectional view of a first module of a lighting device according to the invention designed as a direction indicator

In front of all modules 3, 4, 5, 6, a transparent plastic disc can be arranged, which serves as a cover 7 (see, for example, FIG. 4). Furthermore, between the first modules 3, 4 and the cover 7, LC displays 8 with an inlet surface 9 and an exit surface 10 are arranged, which are marked as gray areas in FIG. 1 and FIG. 2. The LC displays 8 are arranged in such a way that light emanating from the first modules 3, 4 enters the inlet surface 9 of the assigned LC display 8, i.e., the one arranged in front of the module 3, 4.

The LC displays 8 can be passive LC displays 8, which are designed as so-called smart glass displays or guest host displays. In particular, the LC displays 8 can be so-called dye-doped displays, which are doped with color pigments, which determine the color of the LC displays 8 in the non-operating state. The dye-doped liquid crystals doped with color pigments are enclosed between two substrate layers, in particular thin glass panes or plastic films that have an electrically conductive layer. Such an LC display 8 works as compared to conventional LC displays without polarization filters and thus has a comparatively large transmission.

In an operating state (on-state), each of the LC displays 8 allows for the light entered through the inlet surface 9 to escape at least partially, in particular for the most part, from the exit surface 10, whereas in a non-operating state (off-state) the respective LC display 8 does not allow the light entered through the inlet surface 8 to escape from the exit surface 10.

In operation of the lighting device, the LC displays 8 arranged in front of the first modules n 3, 4 are transferred to the operating state when the corresponding first module 3, 4 is activated, so that the light generated by the respective first module 3, 4 can then escape comparatively unhindered from the lighting device.

If the lighting device designed as a rear light is to appear completely red in the inactive state of modules 3, 4, 5, 6, the LC displays 8 may be designed in such a way that they have a red color in the non-operating state. Alternatively, for example, the second modules 5, 6 in the inactive state and the LC displays 8 in the non-operating state may appear black.

The example according to FIG. 2 differs from that according to FIG. 1 in that in the second example the LC displays 8 is formed of several separately switchable segments 11.

Figure 3:
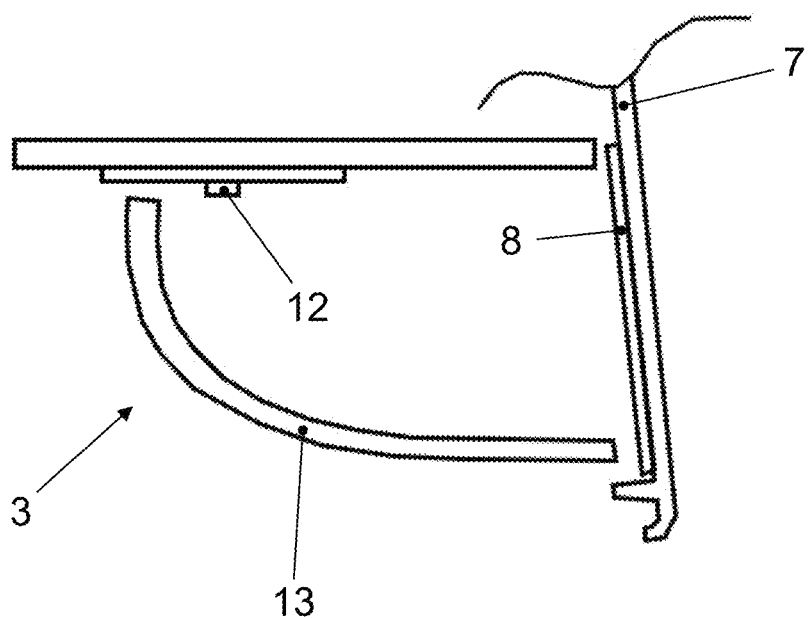
FIG. 3 is a sectional view of a first module of a lighting device according to the invention designed as a direction indicator.

FIG. 3 and FIG. 4 show the structure of one of the first modules 3, which can realize the signal function of a direction indicator. The examples of the first module 3 shown have a light source 12 and an indirect reflector 13. The light source 12 may be, for example, a yellow light-emitting diode.

It is quite possible to use a direct reflector or a Fresnel optic or a lens optic or a light guide instead of an indirect reflector 13.

The light generated by the light source 12 is reflected by the reflector 13 to the inlet surface 9 of the LC display 8 and enters the LC display 8 through this. In the operating state of the LC display 8, a large part of the light that has entered through the inlet surface 9 exits through the exit surface 10 and exits the lighting device through the cover 7.

In the example shown in FIG. 3, the LC display 8 is attached to the side of the cover 7 facing the reflector 13. For this purpose, the LC display is designed as a film element, which can be glued to the cover 7 or inserted into an injection mold as an injection molded part in the course of the production of the cover 7 and can be molded or over-molded with the cover 7.

In the example shown in FIG. 3, the LC display 8 is arranged as a separate part between the reflector 13 and the cover 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:
    at least one first module for at least one first signal light function, the at least one first module has at least one first light source and produces light with a first color in operation of the at least one first signal light function;
    at least one second module for at least one second signal light function, the at least one second module has at least one second light source and produces light with a second color different from the first color in operation of the at least one second signal light function;
    a shared at least partially transparent cover for the at least one first module and the at least one second module which is designed such that in operation of the lighting device, the light emitted by the respective module escapes through the cover from the lighting device; and
    an LC display arranged between the at least one first module and the cover that is controlled such that in operation of the at least one first module, at least part of the light emitted from the at least one first module enters into an inlet surface of the LC display and exits an exit surface of the LC display at least partially in the direction of the cover,
    wherein the LC display is at least partially switchable between an operating state and a non-operating state, wherein in the operating state, the light emitted by the at least one first module at least partially escapes through the exit surface of the LC display and in the non-operating state, the light emitted by the at least one first module does not escape through the exit surface of the LC display, and
    wherein the LC display, in the non-operating state, has a color visible from the outside through the cover which corresponds to the second color and/or the color of the at least one second module visible from the outside through the cover with the at least one second light source switched off.

2. The lighting device according to claim 1, wherein the LC display is a passive LC display.

3. The lighting device according to claim 1, wherein the LC display is a guest host display or a smart glass display.

4. The lighting device according to claim 1, wherein the LC display is an LC display doped with color pigments.

5. The lighting device according to claim 1, wherein the color of the LC display visible in the non-operating state from the outside through the cover is red or black.

6. The lighting device according to claim 1, wherein the at least one first signal light function is the function of a direction indicator with a yellow color and/or a reversing light with a while color.

7. The lighting device according to claim 1, wherein the at least one second signal light function is the function of a taillight and/or a brake light and/or a rear fog light, and wherein the second color is red.

8. The lighting device according to claim 1, wherein the lighting device is a rear light.

9. The lighting device according to claim 1, wherein the LC display has a plurality of segments that are independently controllable between the operating state and the non-operating state or wherein the LC display has at least two segments that are independently controllable between the operating state and the non-operating state.

10. The lighting device according to claim 1, wherein the LC display is attached to the side of the cover facing the at least one first module.

11. The lighting device according to claim 10, wherein the LC display is formed as a film element, the film element being glued to the side of the cover facing the at least one first module or the film element being inserted during a production of the cover as an injection molded part in an injection mold and overmolded with the cover.

12. The lighting device according to claim 1, wherein the LC display is arranged as a separate part between the at least one first module and the cover.

* * * * *